(12) United States Patent
Kwon et al.

(10) Patent No.: US 11,942,628 B2
(45) Date of Patent: Mar. 26, 2024

(54) NEGATIVE ACTIVE MATERIAL FOR LITHIUM SECONDARY BATTERY, PREPARING METHOD FOR THE SAME AND LITHIUM SECONDARY BATTERY INCLUDING THE SAME

(71) Applicant: Hansol Chemical Co., Ltd., Seoul (KR)

(72) Inventors: Seman Kwon, Seoul (KR); Soonho Hong, Jeonju-si (KR); Hyeonwoo Shim, Gwangju (KR); Sunghwan Kang, Wanju-gun (KR); Byunghoon Park, Wanju-gun (KR)

(73) Assignee: Hansol Chemical Co., Ltd., Seoul (KR)

( * ) Notice: Subject to any disclaimer, the term of this patent is extended or adjusted under 35 U.S.C. 154(b) by 307 days.

(21) Appl. No.: 17/338,265

(22) Filed: Jun. 3, 2021

(65) Prior Publication Data
US 2021/0384491 A1    Dec. 9, 2021

(30) Foreign Application Priority Data

Jun. 4, 2020    (KR) .......................... 10-2020-0067579

(51) Int. Cl.
*H01M 4/36*    (2006.01)
*C01B 33/02*    (2006.01)
(Continued)

(52) U.S. Cl.
CPC ............. *H01M 4/366* (2013.01); *C01B 33/02* (2013.01); *H01M 4/386* (2013.01); *H01M 4/587* (2013.01); *H01M 10/052* (2013.01); *C01P 2004/03* (2013.01); *C01P 2004/32* (2013.01); *C01P 2004/61* (2013.01); *C01P 2004/62* (2013.01); *C01P 2004/64* (2013.01);
(Continued)

(58) Field of Classification Search
CPC ................ H01M 4/366; H01M 4/386; H01M 2004/021; H01M 4/587; H01M 10/052; C01B 33/02
See application file for complete search history.

(56) References Cited

U.S. PATENT DOCUMENTS

2019/0260020 A1    8/2019    Yamamoto
2020/0006759 A1    1/2020    Ay

FOREIGN PATENT DOCUMENTS

CN    109873136    6/2019
EP    3644334    4/2020
(Continued)

OTHER PUBLICATIONS

"A Basic Guide to Particle Characterization", Malvern Instruments Worldwide—White Paper, May 2, 2012 (May 2, 2012), pp. 1-26, XP055089322, Retrieved from the Internet: URL:http://golik.co.il/Data/ABasicGuidtoParticleCharacterization(2) 1962085150.pdf [retrieved on Oct. 5, 2021]—* pp. 7,14 *.

*Primary Examiner* — Sarah A. Slifka
(74) *Attorney, Agent, or Firm* — David R. Stevens; Stevens Law Group

(57) ABSTRACT

The present disclosure is directed to a negative electrode active material for lithium secondary batteries, to a method for preparing the same, and to a lithium secondary battery including the same, the negative electrode active material including a porous core in which scaly silicon fragments are connected in an entangled manner; and a shell layer covering the core, where the shell layer includes a carbon-based material and silicon.

19 Claims, 2 Drawing Sheets

(51) Int. Cl.
   *H01M 4/02*   (2006.01)
   *H01M 4/38*   (2006.01)
   *H01M 4/587*  (2010.01)
   *H01M 10/052* (2010.01)

(52) U.S. Cl.
   CPC ...... *C01P 2004/80* (2013.01); *C01P 2006/12* (2013.01); *C01P 2006/14* (2013.01); *C01P 2006/40* (2013.01); *H01M 2004/021* (2013.01); *H01M 2004/027* (2013.01)

(56) References Cited

FOREIGN PATENT DOCUMENTS

| | | |
|---|---|---|
| KR | 1020160066632 | 8/2016 |
| KR | 1020180056395 | 5/2018 |
| KR | 1020150063620 | 5/2020 |

[FIG. 1]
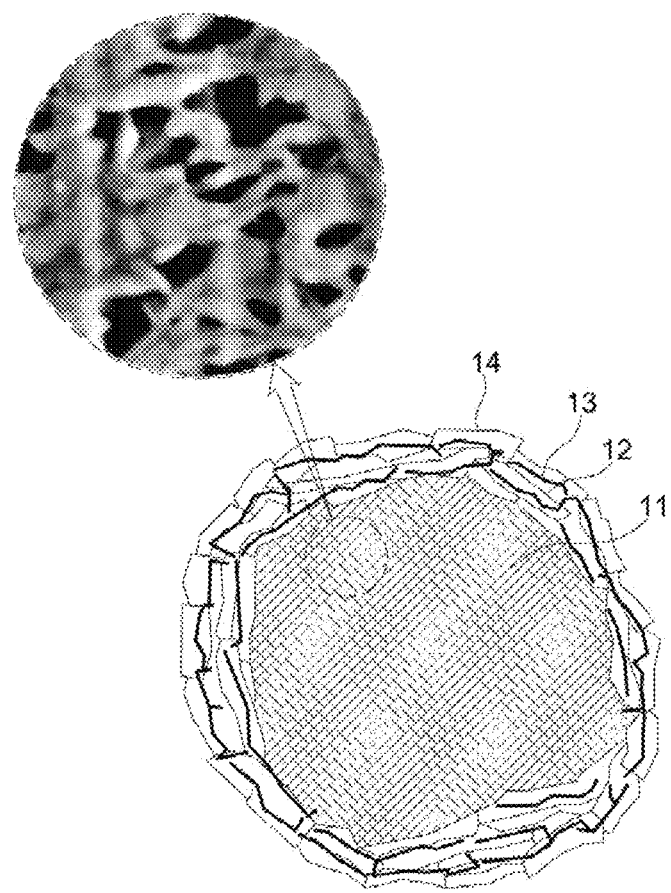

[FIG. 2]
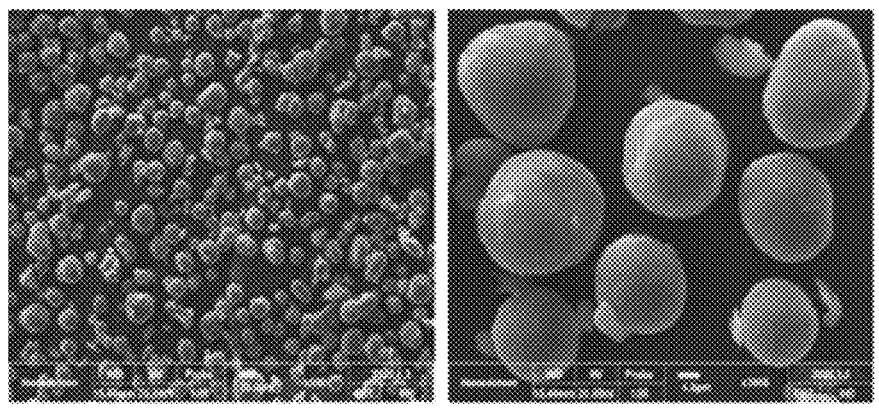
[FIG. 3]
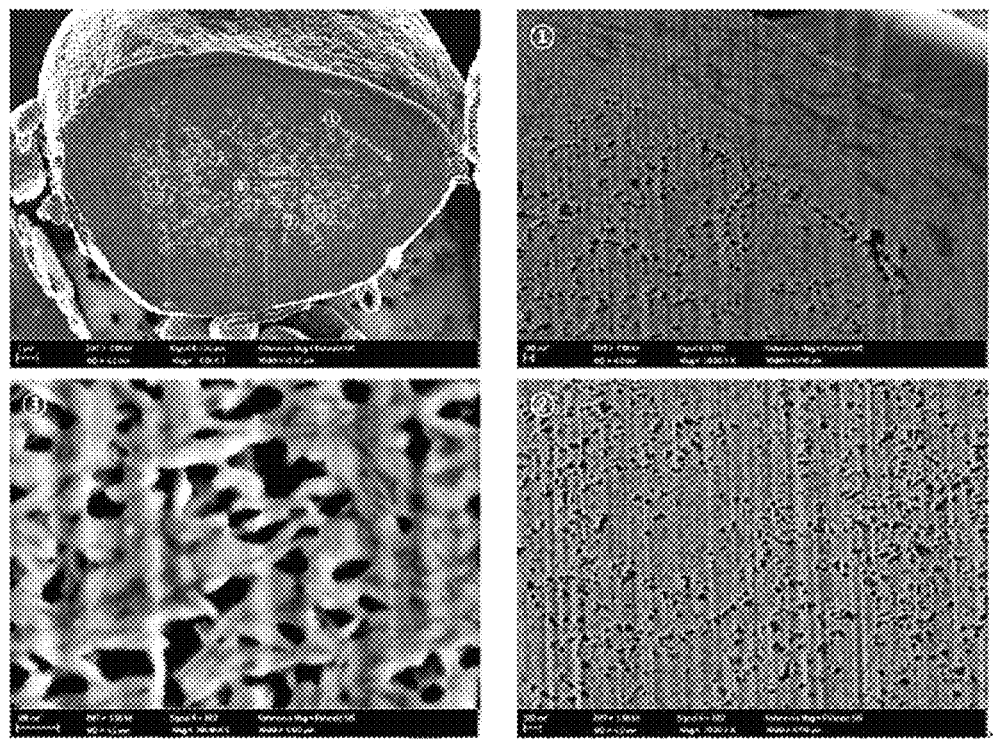

NEGATIVE ACTIVE MATERIAL FOR LITHIUM SECONDARY BATTERY, PREPARING METHOD FOR THE SAME AND LITHIUM SECONDARY BATTERY INCLUDING THE SAME

CROSS-REFERENCE TO RELATED APPLICATION

This application claims priority under 35 U.S.C. § 119 to Korean Patent Application No. 10-2020-0067579, filed on Jun. 4, 2020, in the Korean Intellectual Property Office (KIPO), the disclosure of which is incorporated by reference herein in its entirety.

TECHNICAL FIELD

Embodiments of the present disclosure relate to a negative electrode active material for lithium secondary batteries, to a method for preparing the same, and to a lithium secondary battery including the same, the negative electrode active material having a porous core including scaly silicon, and a shell layer including silicon and carbon.

BACKGROUND ART

Recently, as lithium secondary battery applications are diversified, batteries having a high energy density are required, and accordingly, research and development for increasing the capacity of positive electrode active materials and negative electrode active materials have been conducted as well. The currently available negative electrode active material may include graphite. However, the theoretical capacity of graphite is limited to 372 mAh/g, and accordingly, it is necessary to develop a new high-capacity negative electrode active material, and silicon (Si) or a silicon compound is being studied as a high-capacity material that may replace graphite.

Silicon reversibly occludes and releases lithium through a compound formation reaction with lithium, and has a theoretical maximum capacity of 3572 mAh/g, which is larger than graphite (372 mAh/g), so it is promising as a high-capacity negative electrode material. However, since the silicon-based negative electrode active material has the property of expanding 300 to 400% during charging and discharging, a carbon coating layer may crack or be detached due to volume expansion when charging lithium, and an electrolyte may permeate through the cracks to oxidize the silicon, resulting in problems of a rapid decrease in lifespan. Accordingly, various studies are being conducted on a method for effectively controlling the expansion of the silicon-based negative electrode active material.

For example, there have been attempts to structurally secure voids that serve as buffers during volume expansion of the silicon-based negative electrode active material, but conventional techniques have not clearly presented such methods or require a high-cost process. The present inventors have confirmed that a negative electrode active material including a porous core in which scaly silicon fragments are connected in an entangled manner (e.g., entangled) may suppress the volume expansion that may occur during charging and discharging of the silicon. The inventive concept of the present disclosure is based on this.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present disclosure may be directed to a negative electrode active material for lithium secondary batteries, capable of substantially preventing damage to a carbon coating layer that may occur due to volume expansion during lithium charging of silicon, by securing therein a space for uniform volume expansion.

Aspects of embodiments of the present disclosure may also be directed to a method for preparing the negative electrode active material for lithium secondary batteries.

Aspects of embodiments of the present disclosure may also be directed to a lithium secondary battery including the negative electrode active material for lithium secondary batteries.

According to an embodiment of the present disclosure, a negative electrode active material for lithium secondary batteries includes a core having a porous structure in which scaly silicon fragments are connected in an entangled manner; and a shell layer covering the core, wherein the shell layer includes a carbon-based material and silicon.

According to another embodiment of the present disclosure, a method for preparing a negative electrode active material for lithium secondary batteries includes: (1) preparing a mixed solution in which silicon, a filler, and a binder are dispersed in a solvent; (2) preparing a silicon precursor by pulverizing a mixture containing the mixed solution and spray-drying the pulverized solution; (3) preparing composite particles each having a core-shell structure by mixing the silicon precursor with amorphous carbon and graphite and then performing complexing; and (4) heat-treating the composite particles.

According to another embodiment of the present disclosure, a lithium secondary battery includes: a negative electrode including the negative electrode active material according to an embodiment; a positive electrode; and an electrolyte.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present disclosure will become more apparent by describing in detail embodiments thereof with reference to the accompanying drawings, wherein:

FIG. 1 is a schematic diagram illustrating a negative electrode active material according to an embodiment.

FIG. 2 is a SEM photograph illustrating a negative electrode active material according to an embodiment.

FIG. 3 is a SEM photograph enlarging a negative electrode active material according to an embodiment.

DETAILED DESCRIPTION

Embodiments will now be described more fully hereinafter.

All terms (including technical and scientific terms) used in the present specification may be used as meanings that may be commonly understood by those of ordinary skill in the art, unless otherwise defined. In addition, terms defined in a commonly used dictionary are not interpreted ideally or excessively, unless explicitly defined specifically.

In addition, throughout the specification, when a certain part "includes (comprises)" a certain component, it means that other components may be further included rather than excluding other components, unless otherwise stated. In addition, throughout the specification, the term "above" or "on" means not only the case that is located on or beneath the target part, but also includes the case where there is another part in between thereof and does not mean that it is located above the target part with respect to the direction of gravity.

An embodiment of the present disclosure is directed to a negative electrode (e.g., anode) active material for lithium secondary batteries, the negative electrode active material including a porous core in which scaly (e.g., scaled, scale-shaped, scale-like, flaky etc.) nano-silicon fragments (e.g., segments) are connected in an entangled manner (e.g., entangled); and a shell layer covering (e.g., surrounding, wrapping, etc.) the core, where the shell layer includes a carbon-based material and silicon.

As used herein, "entangled" refers to a secondary structure shape in which a plurality of nano-silicon units are entangled, without a certain shape, in a bundle or a rope shape, for example.

As used herein, "connected in an entangled manner" refers to a state in which nano-silicon entangled in the shape of a plurality of bundles or ropes are connected to each other in an entangled manner.

<Core>

According to an embodiment of the present disclosure, the nano-silicon may be scaly silicon having an average particle diameter (D50) of 200 nm or less. Preferably, the size in a range of 80 to 130 nm facilitates realization of performance of the negative electrode material. When it is larger than the above range, the capacity may be high, but it may be significantly disadvantageous in terms of lifespan, and when it is smaller than the above range, it may be disadvantageous in terms of manufacturing cost and capacity realization.

The average particle diameter (D50) may be defined as a particle diameter with respect to 50% of the particle diameter distribution. The average particle diameter is not particularly limited, but may be measured using, for example, a laser diffraction method or a scanning electron microscope (SEM) photograph. In general, the laser diffraction method may measure a particle diameter from a submicron region to about several millimeters and may result in high reproducibility and high resolution.

According to an embodiment, the nano-silicon may have an average particle size in a range of 0.01 to 0.2 μm. When the average particle size of the nano-silicon is larger than the above range, it may be disadvantageous in terms of volume expansion and lifespan, and when it is smaller than the above range, capacity and initial efficiency may decrease.

According to an embodiment, the nano-silicon is characterized in that it has a scale shape rather than a needle shape.

According to an embodiment, the scaly nano-silicon may have a degree of sphericity of 0.5 or less.

As used herein, the "degree of sphericity" means a ratio of a longest straight distance among cross-sections of the silicon nanoparticle and a shortest straight distance among the cross-sections of the silicon nanoparticles and may be referred to as "aspect ratio (long-short ratio)" or "length/thickness ratio". The degree of sphericity is preferably in a range of 0.1 to 0.5, and more preferably in a range of 0.1 to 0.3. When the degree of sphericity is in a range of 0.1 to 0.5, an expansion rate of an electrode plate may decrease when preparing the negative electrode, and accordingly, the lifespan of the battery may be improved.

According to an embodiment, the nano-silicon fragment may have the degree of sphericity within the above range, and thus may be in the shape of a scale, rather than a needle shape, and may specifically be in the shape of a scale piece, a hot cake, a disk, or a plate.

In the negative electrode active material according to an embodiment of the present disclosure, the core may be a porous core in which scaly nano-silicon fragments are connected to each other in an entangled manner.

According to an embodiment, the core may have a porous structure, in which a total pore volume may be in a range of 0.2 to 0.5 $cm^3/g$, and preferably 0.3 to 0.4 $cm^3/g$. When the total pore volume of the core is less than 0.2 $cm^3/g$, the effect of securing therein a space for volume expansion of the core to substantially prevent damage to the shell layer that may occur due to volume expansion during lithium charging may be insufficient. When the total pore volume of the core exceeds 0.5 $cm^3/g$, the porous entangled silicon structure of the core may collapse during preparing of the core-shell structure, resulting in a decrease in capacity and lifespan.

According to an embodiment, an average size of the pores formed in the core may be in a range of 10 to 300 nm, and preferably 20 to 100 nm. The average pore size may be obtained by measuring the pore size using Tristar III (Micromeritics) and calculating an average value.

According to an embodiment, the core may have a specific surface area in a range of 10 to 40 $m^2/g$, and preferably 20 to 30 $m^2/g$. As used herein, the specific surface area is measured by a BET method, and may be obtained by measuring a nitrogen gas adsorption amount under a liquid nitrogen temperature of 77 K using Tristar III (Micromeritics).

According to an embodiment, the core may have an average particle diameter (D50) in a range of 2 to 20 μm. When the average particle diameter of the core is larger than 20 μm, conductivity of the porous silicon may be lowered, and when it is less than 2 μm, the specific surface area increases, which may be disadvantageous in terms of capacity realization and lifetime.

According to an embodiment, the core may be included in an amount in a range of 5 to 70 wt % with respect to the total weight of the negative electrode active material. When the core is included within the above range, an expansion rate of the electrode plate may be improved and the battery life may be improved, without reducing the capacity of the prepared negative electrode.

According to an embodiment, the scaly nano-silicon fragments may be connected in an entangled state by mixing a filler with the nano-silicon. The filler may be one or more selected from the group consisting of paraffin wax, stearic acid, palmitic acid, fatty acid, and ethylene vinyl acetate. The filler is mixed with the nano-silicon to serve as a filler and then removed during a carbonization process after complexing, thereby giving pores to the core. As illustrated in FIG. 1, the core 11 has a structure in which nano-silicon is connected in an entangled state and pores are formed.

According to an embodiment, the core may further include a binder to form a porous structure. In the present disclosure, the binder may connect the scaly nano-silicon fragments to thereby form a porous structure. For example, the binder may be at least one selected from the group consisting of paraffin wax, polyethylene, stearic acid, and ethylene vinyl acetate, but embodiments are not limited thereto. The binder is removed by a subsequent heat treatment process.

<Shell Layer>

In the negative electrode active material for lithium secondary batteries according to an embodiment of the present disclosure, the shell layer including a carbon-based material and silicon may cover (e.g., surround, wrap, etc.) the core.

According to an embodiment, the carbon-based material may be graphite and amorphous carbon.

The amorphous carbon may be obtained from a carbon precursor containing at least one selected from the group consisting of sucrose, phenol resins, naphthalene resins, polyvinyl alcohol resins, furfuryl alcohol resins, polyacrylonitrile resins, polyamide resins, furan resins, cellulose resins, styrene resins, polyimide resins, epoxy resin, vinyl chloride resins, coal-based pitches, petroleum-based pitches, polyvinyl chloride, mesophase pitches, tar, block copolymer, polyol and low molecular weight heavy oil.

As used herein, "amorphous carbon" refers to carbon in a state in which carbon atoms are arranged in disorder.

According to an embodiment, the amorphous carbon may be coal-based pitches, petroleum-based pitches, mesophase pitches, phenolic resins, heavy oils, or combinations thereof.

Preferably, the amorphous carbon may be a pitch. More preferably, a pitch having a softening point in a range of 100 to 250° C. is preferable. It is preferable that an average size of the pitch is in a range of 1 to 10 µm. The pitch is melted in the process of complexing (e.g., compounding) so that the scaly graphite and the shell layer may be appropriately immobilized (e.g., secured, fixed, etc.) on a surface of the nano-silicon core.

When using pitches, it may be a coal-based pitch or a petroleum-based pitch having a content of quinoline insoluble (QI) of 5 percentage by weight (wt %) or less, and preferably 1 wt % or less. This is because the high molecular weight quinoline insoluble component has characteristics that it interferes with securing of uniformity in the complexing process and increases an irreversible capacity of the negative electrode material. Specific examples of the coal-based pitch may include coal tar pitch and liquefied coal pitches, and specific examples of the petroleum-based pitch may include decant oil pitch and ethylene tar pitch.

According to an embodiment, the amorphous carbon may be included in an amount in a range of 5 to 50 wt % with respect to the total weight of the negative electrode active material. When the amorphous carbon is included within the above range, the expansion rate of the electrode plate may be improved, and the battery life may be improved, without reducing the capacity of the prepared negative electrode.

According to an embodiment, the graphite may be scaly graphite. Scaly graphite is suitable for covering the core because it has a mobility between graphene layers that is physically good enough to be used as a lubricant.

According to an embodiment, it is preferable that the scaly graphite is natural graphite. It is preferable to use the graphite of a high purity quality, having a fixed carbon content of 99% or more, and preferably 99.95% or more.

According to an embodiment, the graphite may be included in an amount in a range of 5 to 50 wt % with respect to the total weight of the negative electrode active material. When the graphite is included within the above range, the expansion rate of the electrode plate may be improved, and the battery life may be improved, without reducing the capacity of the prepared negative electrode.

According to an embodiment, the graphite may have an average size in a range of 10 to 200 µm. When it is larger than the above range, it may not be complexed and may remain independently, and when it is smaller than this, it may not be able to sufficiently cover the silicon. When the graphite has an average size within the above range, it may sufficiently cover the silicon to prevent oxidation by the electrolyte, the expansion rate of the electrode plate may be improved, and the battery life may be improved, without reducing the capacity of the prepared negative electrode.

The shell layer may be formed by complexing the scaly nano-silicon of the core with the carbon-based material.

According to an embodiment, the shell layer may be a composite (e.g., complex, compound, etc.) of the scaly nano-silicon of the core together with the amorphous carbon and the scaly graphite. Specifically, in the shell layer, as illustrated in FIG. 1, the amorphous carbon 13 may be distributed between the scaly graphite fragments 12, and the scaly nano-silicon 14 may be combined on upper and lower surfaces of the scaly graphite fragments 12 in a regular or irregular shape.

Accordingly, the shell layer may have a high density. Preferably, the shell layer may have a density in a range of 0.5 to 2 g/cc. The density may be measured by measuring a true density of graphite and amorphous carbon only and may be measured by Accupyc II 1340 (Micromeritics). When the density of the shell layer is less than 0.5 g/cc, the effect of improving the structural stability of the negative electrode active material by the shell may be insufficient. On the other hand, when the density of the shell layer is less than 0.5 g/cc, the physical strength may be weak and the shell layer may easily collapse during battery manufacturing, thereby increasing irreversible capacity and reducing lifespan. When the density of the shell layer exceeds 2 g/cc, it makes manufacturing difficult. This is because when the shell layer includes amorphous carbon and graphite, the true density is 2 g/cc or less.

In addition, the shell layer preferably has a thickness in a range of 10 to 60% with respect to the average particle diameter of the negative electrode active material, and more preferably may have a thickness in a range of 20 to 40%. When the thickness of the shell layer is less than 10%, the effect of improving the structural stability of the negative electrode active material by the shell may be insufficient, and when the thickness of the shell layer exceeds 60%, it may be difficult to expect a high capacity.

According to an embodiment, the negative electrode active material may have an average particle diameter (D50) in a range of 3 to 25 µm, and preferably 10 to 20 µm. When the average particle diameter of the negative electrode active material is 3 µm or more, the density of the electrode is prevented from being lowered to have an appropriate capacity per volume, and when the average particle size is 25 µm or less, a slurry for forming the electrode may be appropriately coated with a uniform thickness.

Another embodiment of the present disclosure provides a method for preparing a negative electrode active material for lithium secondary batteries: the method including: (1) preparing a mixed solution in which silicon, a filler, and a binder are dispersed in a solvent; (2) preparing a silicon precursor by pulverizing a mixture containing the mixed solution and spray-drying the pulverized solution; (3) preparing composite particles each having a core-shell structure by mixing the silicon precursor with amorphous carbon and graphite and then performing complexing; and (4) heat-treating the composite particles.

In the preparing of the mixed solution (1), the filler may be at least one selected from the group consisting of paraffin wax, stearic acid, palmitic acid, fatty acids, and ethylene vinyl acetate. The filler may be mixed with the nano-silicon to serve as a filler and then removed during a carbonization process after complexing to impart pores to the core.

In the preparing of the mixed solution (1), the binder may be at least one selected from the group consisting of paraffin wax, polyethylene, stearic acid, and ethylene vinyl acetate, but embodiments are not limited thereto. As described above, the binder may connect the scaly silicon fragments and may be removed in a subsequent heat treatment process, thereby imparting a porous structure.

According to an embodiment, when pulverized in the preparing of the silicon precursor (2), the mixture including silicon, the filler, and the binder may be pulverized to a particle size in a range of 80 to 130 nm to form a scaly silicon precursor.

Specifically, the preparing of the silicon precursor (2) may be preparing of a scaly silicon precursor through mechanical milling. Mechanical milling may be any one of bead milling, ball milling, mechano-fusion milling, shaker milling, planetary milling, attritor milling, disk milling, or a combination thereof.

When performing mechanical milling as described above, it may be possible to prepare scaly nano-silicon having a sphericity or aspect (long-short) ratio of 0.5 or less, and further, since a porous core in which the scaly nano-silicon fragments are connected in an entangled manner is prepared, a number of pores may be formed inside the core. Accordingly, it is possible to accommodate the increased volume of silicon that expands during charging of the lithium secondary battery, and thus the electrode plate detachment that may occur due to the volume expansion of the active material during charging of the lithium secondary battery may be more effectively alleviated.

According to an embodiment, in the preparing of the composite particles (3), a mass ratio of the silicon precursor (core), the amorphous carbon, and the graphite is preferably in a range of 30 to 70:30 to 15:40 to 15 by weight after carbonization, and more preferably, in a range of 35 to 55:35 to 20:30 to 20. By using the negative electrode active material with the above composition, the discharge capacity, charge/discharge efficiency, and electrode plate expansion rate may be improved, and battery life may be improved, when preparing the electrode.

According to an embodiment of the present disclosure, in the preparing of the composite particles (3), the complexing may be performed for 1 to 60 minutes, and more preferably for 5 to 30 minutes. When the complexing time is less than 5 minutes, the shell layer may be insufficiently formed on a surface of the core, and thus the effect of improving the structural stability of the negative electrode active material may be insufficient, and when the complexing time exceeds 30 minutes, the core structure may be collapsed, and the nano-silicon may be exposed to the shell layer, which may limit the capacity and lifetime.

According to an embodiment, in the preparing of the composite particles (3), the complexing may be performed using a melt-mixing method.

In the case of using a pitch as the amorphous carbon, it is preferable that in the preparing of the composite particles (3), the complexing is performed at 100 to 250° C. When the complexing temperature is less than 100° C., the pitch used as the amorphous carbon is not completely melted, and thus immobilizing of the scaly graphite and the shell layer on the surface of the nano-silicon core may be insufficient.

The complexing process includes filling an internal inert gas and raising an internal temperature to 100 to 250° C.

According to an embodiment, in the heat-treating (4), by applying a high temperature heat in a heat treatment furnace, amorphous carbon may be pyrolyzed to supply carbon to the silicon (Si) surface and coat the surface with carbon, and thus a Si—C nanocomposite negative electrode active material may be formed.

According to an embodiment, in the heat-treating (4), a heat treatment temperature is preferably 700 to 1100° C., more preferably 800 to 1050° C., and most preferably 900 to 1000° C.

According to an embodiment, in the heat-treating (4), a heat treatment time is preferably in a range of 1 to 10 hours, and more preferably 3 to 7 hours.

According to an embodiment, in the heat-treating (4), the heat treating may be performed under an atmosphere including nitrogen, argon, hydrogen, or a mixed gas thereof, or under vacuum.

By using the method for preparing a negative electrode active material for lithium secondary batteries according to an embodiment of the present disclosure as described above, the negative electrode active material including the porous core in which the scaly silicon fragments are connected in an entangled manner may be prepared, and thus a space for uniform volume expansion may be secured therein. Accordingly, a large volume change of silicon may be effectively buffered during charging and discharging, and thus damage to the carbon coating layer due to volume expansion of the silicon may be substantially prevented.

In addition, it is possible to effectively prepare the negative electrode active material for lithium secondary batteries in which the structural stability of the composite particles may be improved due to the shell layer formed on the core, relatively high charge/discharge capacity and excellent cycle life may be achieved as the contact between the core particles and the electrolyte is suppressed during repeated charging and discharging, the initial efficiency of charging and discharging may be improved as the silicon particles are prevented from being exposed to the electrolyte, and the thermal stability may be effectively improved as an exothermic reaction between the lithium stored in the silicon particles and the electrolyte is suppressed.

In addition, another embodiment of the present disclosure is directed to a lithium secondary battery including a negative electrode including the negative electrode active material; a positive electrode (e.g., cathode); and an electrolyte.

The lithium secondary battery may have excellent charging and discharging capacity characteristics and cycle characteristics as it includes the negative electrode active material that has a high buffering effect against a change in the volume of silicon which may occur during the charging and discharging process and has an excellent electrical conductivity.

According to an embodiment, the lithium secondary battery may include a negative electrode active material having a capacity of 1300 mAh/g or more, an initial charge/discharge efficiency of 80% or more, a discharge capacity retention rate of 70% or more after 100 charge/discharge cycles, and a volume expansion rate of 50% or less.

Specifically, as shown in Table 2 below, the lithium secondary battery using the negative electrode active material according to an embodiment of the present disclosure had a capacity of 1352 mAh/g or more, an initial charge/discharge efficiency of 84.2% or more, a discharge capacity retention rate of 85.1% or more after 100 charge/discharge cycles, and a volume expansion rate of 48% or less.

On the other hand, a lithium secondary battery using a negative electrode active material prepared in Comparative Example 1 using 30 to 50 nm spherical silicon had a capacity of 1211 mAh/g, an initial charge/discharge efficiency of 83.5%, a discharge capacity retention rate of 55.5% after 100 charge/discharge cycles, and a volume expansion rate of 40%.

As such, the lithium secondary battery according to an embodiment of the present disclosure has excellent charging and discharging capacity characteristics and cycle characteristics as it includes the negative electrode active material having a high buffering effect against a change in the volume of silicon that may occur in the charging and discharging process and having an excellent electrical conductivity.

Hereinafter, the present disclosure will be described in more detail through examples. These examples are only for describing the present disclosure in more detail, and it will be apparent to those of ordinary skill in the art that the scope of the present disclosure is not limited by these examples based on the gist of the present disclosure.

Example 1 Preparation of Negative Electrode Active Material 1 wt % of metal grade silicon (MGS), with a purity of 99.5% or more, pulverized to D50=15 μm, 10 wt % of isopropyl alcohol, and 0.2 wt % of stearic acid were put into a bead mill and pulverized to a particle size of 102 nm, and the pulverized solution was spray-dried with a spray-drier, and thus a silicon precursor powder having D50=5 μm was prepared. In such an embodiment, Mastersizer3000 (Malvern Panalytical) was used for particle size measurement, Zeta RS4 (Netzsch, Germany), which is a bead mill, was used for pulverizing, and Mobile Minor (GEA, Denmark) was used for spray-drying.

After carbonizing the above silicon precursor powder, a petroleum pitch having a softening point of 230° C., and a graphite (purity of 99.9% or more, particle size of 200 mesh or more), they were put into a complexer (manufactured by Hansol Chemical) in a ratio of 50:30:20 by weight to perform complexing for 30 minutes, thus preparing a core-shell structure, followed by heat treatment at 900° C., and thereby a negative electrode active material was prepared. In such an embodiment, in the complexing process, the nano-silicon was complexed with carbon (pitch+graphite) to form a shell layer.

Then, a smooth (e.g., planar, even, level, etc.) sample for microscope observation was prepared using a Focused Ion Beam device (JIB-4601F, JEOL). The sample for microscope observation was observed with a scanning electron microscope (SEM), and SEM photographs were taken, which are illustrated in FIGS. 2 to 3.

Example 2

A negative electrode active material was prepared in the same manner as in Example 1, except that the silicon size of Example 1 was 85 nm.

Example 3

A negative electrode active material was prepared in the same manner as in Example 1, except that the silicon size of Example 1 was 128 nm.

Example 4

A negative electrode active material was prepared in the same manner as in Example 1, except that the complexing time of Example 1 was set to 5 minutes to control the coating thickness.

Example 5

A negative electrode active material was prepared in the same manner as in Example 1, except that the complexing time of Example 1 was set to 20 minutes to control the coating thickness.

Example 6

A negative electrode active material was prepared in the same manner as in Example 1, except that the stearic acid of Example 1 was added in an amount of 0.05 wt %.

Example 7

A negative electrode active material was prepared in the same manner as in Example 1, except that the stearic acid of Example 1 was added in an amount of 0.3 wt/o.

Comparative Example 1

A negative electrode active material was prepared in the same manner as in Example 1, except that a precursor was prepared by dispersing 1 wt % of 30 to 50 nm spherical silicon (Nanostructured & Amorphous Materials, USA) and 0.2 wt % of stearic acid in 10 wt % of isopropyl alcohol and then spray-drying the dispersed mixture.

Experimental Example 1: Electrochemical Evaluation Method

A 2032 coin cell was used to evaluate electrochemical properties in the experiment. A capacity per mass and an initial efficiency were evaluated with a half cell, and life characteristics were evaluated with a full cell.

An electrode plate for evaluation was prepared as follows: 93.5 wt % of the negative electrode active materials prepared in Examples 1 to 7 and Comparative Example 1, 3 wt % of a carbon fiber conductive material, 1.5 wt/o of a carboxymethyl cellulose thickener, and 2 wt % of a styrene-butadiene rubber binder were mixed in a pure solvent, and thus a negative electrode active material slurry was respectively prepared. Then, the slurry was coated on a Cu foil current collector and dried, and rolled to a mixture density of 1.55 g/cc, and thus a negative electrode was respectively prepared.

96 wt % of an NCM positive electrode active material, 2 wt % of an acetylene black conductive material, and 2 wt % of a polyvinylidene fluoride binder were mixed in an N-methyl pyrrolidone solvent to prepare a positive electrode active material slurry. Then, the positive electrode active material slurry was coated on an Al foil current collector, dried, and rolled, and thus a positive electrode was prepared.

A lithium secondary battery was manufactured by a conventional process, using the positive electrode, the negative electrode, and a non-aqueous electrolyte. A mixed solvent of ethylene carbonate and diethyl carbonate (EC:DEC=3:7) in which 1.0 M of $LiPF_6$ was dissolved was used as the non-aqueous electrolyte for the half cell, and an electrolyte in which 20% of FEC was added to the electrolyte for the half cell was used for the non-aqueous electrolyte for the full cell for the life evaluation. In addition, amounts of the positive electrode active material and the negative electrode active material were adjusted so that an N/P ratio, which is the maximum capacity ratio per unit area of the negative electrode active material to the maximum capacity per unit area of the positive electrode active material, was 1.1.

An average pore size of the nano-silicon precursor (core) was measured using Tristar III (Micromeritics).

The nano-silicon precursor (core) was heat-treated in an $N_2$ atmosphere, and then a specific surface area was measured. Specifically, the specific surface area of the core was calculated by the BET method by obtaining a nitrogen gas adsorption amount under a liquid nitrogen temperature of 77 K using Tristar III (Micromeritics).

The nano-silicon precursor (core) was cut with focus ion beam (FIB), and then 50 nano-sized silicon particles were randomly selected on an electron microscope (SEM), and an average value of a ratio of a length and a thickness was calculated, which is shown in the Table 1 below.

A density of the shell layer was measured by Accupyc II 1340 (Micromeritics). The measured values are shown in Table 1 below.

As shown in Table 2, the lithium secondary battery including the negative electrode active material according to embodiments of the present disclosure (Examples 1 to 7) had a capacity of 1341 mAh/g or more, an initial charge/discharge efficiency of 79.5% or more, a discharge capacity retention rate of 71.7% or more after 100 charge/discharge cycles, and a volume expansion rate of 48% or less. On the other hand, the lithium secondary battery including the negative electrode active material prepared in Comparative Example 1 using 30 to 50 nm spherical silicon had a capacity of 1211 mAh/g, an initial charge/discharge efficiency of 83.5%, a discharge capacity retention rate of 55.5% after 100 charge/discharge cycles, and a volume expansion rate of 40%.

Based on these results, it was appreciated that the lithium secondary battery according to an embodiment of the present disclosure has high charge/discharge capacity characteristics and excellent cycle characteristics as it includes a negative electrode active material having a high buffering effect against the change in the volume of silicon that may occur during the charging and discharging process and having an excellent electrical conductivity.

As set forth hereinabove, according to one or more embodiments of the present disclosure, as a negative elec-

TABLE 1

|  | Silicon size, D50(nm) | Silicon length/thickness ratio | Average pore size. of core (nm) | Total pore volume of core (cm$^3$/g) | Specific surface area of core (m$^2$/g) |
| --- | --- | --- | --- | --- | --- |
| Example 1 | 102 | 0.22 | 49.3 | 0.3487 | 28.3 |
| Example 2 | 85 | 0.19 | 54.8 | 0.2872 | 33.4 |
| Example 3 | 128 | 0.23 | 62.9 | 0.3992 | 23.2 |
| Example 4 | 102 | 0.22 | 49.3 | 0.3487 | 28.3 |
| Example 5 | 102 | 0.22 | 49.3 | 0.3487 | 28.3 |
| Example 6 | 103 | 0.21 | 56.0 | 0.2906 | 27.8 |
| Example 7 | 104 | 0.21 | 74.5 | 0.4272 | 27.5 |
| Comp. Example 1 | 30~50 | 0.98 | 33.0 | 0.0670 | 8.1 |

The prepared lithium secondary battery was charged and discharged 100 cycles at 1 C, and a ratio of a 100th cycle discharge capacity to a first cycle discharge capacity was calculated and shown as 100th cycle life (%) in Table 2 below.

The lithium secondary battery was charged and discharged 100 cycles at 1 C. A thickness of the battery before charging and discharging was measured and a thickness of the battery after 100 charging and discharging cycles was measured, and a change in the thickness of the battery after 100 charging and discharging cycles with respect to the thickness before charging and discharging was measured to evaluate the degree of volume expansion. The results are shown in Table 2 below.

trode active material includes a porous core in which scaly silicon fragments are connected in an entangled manner in order to secure therein a space for volume expansion, it may effectively buffer large volume changes of silicon during charging and discharging, and accordingly, it is possible to prevent damage to the carbon coating layer due to volume expansion of silicon. In addition, it is possible to prepare the lithium secondary battery in which the structural stability of the composite particles may be improved due to the shell layer formed on the core, relatively high charge/discharge capacity and excellent cycle life may be achieved as the contact between the core particles and the electrolyte is suppressed during repeated charging and discharging, the initial efficiency of charging and discharging may be improved as the silicon particles are prevented from being

TABLE 2

|  | Shell layer density (g/cc) | Capacity (mAh/g) | Efficiency (%) | 100th cycle life (%) | Volume expansion (%) |
| --- | --- | --- | --- | --- | --- |
| Example 1 | 1.6 | 1527 | 88.6 | 90.2 | 32 |
| Example 2 | 1.6 | 1352 | 85.7 | 93.1 | 40 |
| Example 3 | 1.6 | 1621 | 90.1 | 81.6 | 33 |
| Example 4 | 1.6 | 1341 | 79.5 | 71.7 | 48 |
| Example 5 | 1.6 | 1485 | 85.2 | 80.2 | 42 |
| Example 6 | 1.6 | 1522 | 88.1 | 88.8 | 41 |
| Example 7 | 1.6 | 1455 | 84.2 | 85.1 | 38 |
| Comp. Example 1 | 1.6 | 1211 | 83.5 | 55.5 | 40 | exposed to the electrolyte, and the thermal stability may be effectively improved as an exothermic reaction between the lithium stored in the silicon particles and the electrolyte is suppressed.

While the present disclosure has been illustrated and described with reference to the embodiments thereof, it will be apparent to those of ordinary skill in the art that various changes in form and detail may be made thereto without departing from the spirit and scope of the present disclosure.

What is claimed is:

1. A negative electrode active material for lithium secondary batteries, the negative electrode active material comprising:
   a porous core in which scaly nano-silicon fragments are connected in an entangled manner; and
   a shell layer covering the core,
   wherein the shell layer includes a carbon-based material and silicon,
   wherein the carbon-based material is graphite and amorphous carbon,
   wherein the graphite is comprised of scaly graphite fragments, and
   wherein the amorphous carbon is distributed between the scaly graphite fragments, and the scaly nano-silicon fragments are combined on upper and lower surfaces of the scaly graphite fragments in a regular or irregular shape.

2. The negative electrode active material for lithium secondary batteries of claim 1, wherein the scaly nano-silicon fragments have an average particle diameter (D50) in a range of 80 to 130 nm.

3. The negative electrode active material for lithium secondary batteries of claim 1, wherein the scaly nano-silicon fragments have a degree of sphericity of 0.5 or less.

4. The negative electrode active material for lithium secondary batteries of claim 1, wherein the core has a total pore volume in a range of 0.2 to 0.5 cm$^3$/g.

5. The negative electrode active material for lithium secondary batteries of claim 1, wherein the core has a specific surface area in a range of 10 to 40 m$^2$/g.

6. The negative electrode active material for lithium secondary batteries of claim 1, wherein the core has an average particle diameter (D50) in a range of 2 to 20 μm.

7. The negative electrode active material for lithium secondary batteries of claim 1, wherein the core is included in an amount in a range of 5 to 70 percentage by weight (wt %) with respect to the total weight of the negative electrode active material.

8. The negative electrode active material for lithium secondary batteries of claim 1, wherein the scaly nano-silicon fragments are connected in an entangled manner by mixing a filler with nano-silicon.

9. The negative electrode active material for lithium secondary batteries of claim 1, wherein the amorphous carbon is obtained from a carbon precursor containing at least one selected from the group consisting of sucrose, phenol resins, naphthalene resins, polyvinyl alcohol resins, furfuryl alcohol resins, polyacrylonitrile resins, polyamide resins, furan resins, cellulose resins, styrene resins, polyimide resins, epoxy resin, vinyl chloride resins, coal-based pitches, petroleum-based pitches, a mesophase pitch, polyvinyl chloride, mesophase pitches, tar, block copolymer, polyol and low molecular weight heavy oil, a heavy oil, or a combination thereof.

10. The negative electrode active material for lithium secondary batteries of claim 1, wherein the amorphous carbon is a coal-based pitch or a petroleum-based pitch having a quinoline insoluble (QI) content of 5 wt % or less.

11. The negative electrode active material for lithium secondary batteries of claim 1, wherein the graphite is scaly graphite.

12. The negative electrode active material for lithium secondary batteries of claim 1, wherein the graphite is a natural graphite having an average size in a range of 10 to 200 μm.

13. The negative electrode active material for lithium secondary batteries of claim 1, wherein the shell layer is formed by combining the scaly nano-silicon fragments of the core with the carbon-based material.

14. The negative electrode active material for lithium secondary batteries of claim 1, wherein the shell layer has a density in a range of 0.5 to 2 g/cc.

15. A lithium secondary battery comprising:
   a negative electrode comprising the negative electrode active material of claim 1;
   a positive electrode; and
   an electrolyte.

16. The lithium secondary battery of claim 15, wherein the lithium secondary battery comprises the negative electrode active material having a capacity of 1300 mAh/g or more, an initial charge/discharge efficiency of 80% or more, a discharge capacity retention rate of 70% or more after 100 charge/discharge cycles, and a volume expansion ratio of 50% or less.

17. A method for preparing a negative electrode active material for lithium secondary batteries of claim 1, the method comprising:
   (1) preparing a mixed solution in which silicon, a filler, and a binder are dispersed in a solvent;
   (2) preparing a silicon precursor by pulverizing a mixture containing the mixed solution and spray-drying the pulverized solution;
   (3) preparing composite particles each having a core-shell structure by mixing the silicon precursor with amorphous carbon and graphite and then performing a combination process; and
   (4) heat-treating the composite particles.

18. The method of claim 17, wherein in the preparing of the silicon precursor (2), the mixture including the silicon, the filler, and the binder is pulverized to a particle size in a range of 80 to 130 nm to form a scaly silicon precursor.

19. The method of claim 17, wherein in the preparing of the composite particles (3), a mass ratio of the silicon precursor, the amorphous carbon, and the graphite is in a range of 30 to 70:30 to 15:40 to 15 by weight after carbonization.

* * * * *